US007197097B2

(12) United States Patent
Takiue

(10) Patent No.: US 7,197,097 B2
(45) Date of Patent: Mar. 27, 2007

(54) APPARATUS AND METHOD FOR RE-SYNCHRONIZATION OF TRANSMITTED SERIAL SIGNAL OF DATA FRAME AND IDLE PATTERN

(75) Inventor: Hirofumi Takiue, Tokyo (JP)

(73) Assignee: NEC Corporation, Tokyo (JP)

( * ) Notice: Subject to any disclaimer, the term of this patent is extended or adjusted under 35 U.S.C. 154(b) by 729 days.

(21) Appl. No.: 10/674,526

(22) Filed: Oct. 1, 2003

(65) Prior Publication Data

US 2004/0066869 A1    Apr. 8, 2004

(30) Foreign Application Priority Data

Oct. 2, 2002    (JP) .............................. 2002-289457

(51) Int. Cl.
*H04L 25/38* (2006.01)
*H03D 3/24* (2006.01)
(52) U.S. Cl. ...................................... 375/369; 375/376
(58) Field of Classification Search ................ 375/351, 375/362–370, 376
See application file for complete search history.

(56) References Cited

U.S. PATENT DOCUMENTS

| 4,129,748 | A | * | 12/1978 | Saylor | .......................... | 375/376 |
| 5,040,195 | A | * | 8/1991 | Kosaka et al. | ............... | 375/365 |
| 5,235,332 | A | * | 8/1993 | Stephenson, Jr. | ............. | 341/50 |
| 5,509,037 | A |   | 4/1996 | Buckner et al. | | |
| 5,692,021 | A | * | 11/1997 | Walker | ........................ | 375/354 |
| 6,594,325 | B1 | * | 7/2003 | Li | .............................. | 375/354 |

FOREIGN PATENT DOCUMENTS

| JP | 05-136774 | 6/1993 |
| JP | 06-350581 | 12/1994 |
| JP | 08-237232 | 9/1996 |
| JP | 9-509536 | 9/1997 |
| JP | 2001-520417 | 10/2001 |
| JP | 2002-101084 | 4/2002 |

* cited by examiner

*Primary Examiner*—Don N. Vo
(74) *Attorney, Agent, or Firm*—McGinn IP Law Group, PLLC

(57) ABSTRACT

There is provided a data re-synchronization apparatus for suppressing occurrence of a jitter in a high-speed serial signal transmitted over a long distance to improve a reliability of re-synchronized data. In the apparatus, a shift register serial-parallel conversion circuit inputs the serial signal and converts an input data signal to parallel data signals of a predetermined number of parallel bits. An input data extension circuits extend the parallel data signals by a predetermined clock length time-axially to provide extended data signals. An input pattern detection circuit sends an input take-in signal so that data can be taken in at roughly a center of variation points of the extended data signals, while a re-synchronized data take-in signal generation circuit latches the input take-in signal in synchronization with an output clock signal. Data re-synchronization circuits latch the extended data signals respectively at input timing of a re-take-in signal, while a data delay circuit holds data until bit strings of an idle pattern are all output. A data selection circuit outputs an output data signal in synchronization with the idle pattern.

11 Claims, 14 Drawing Sheets

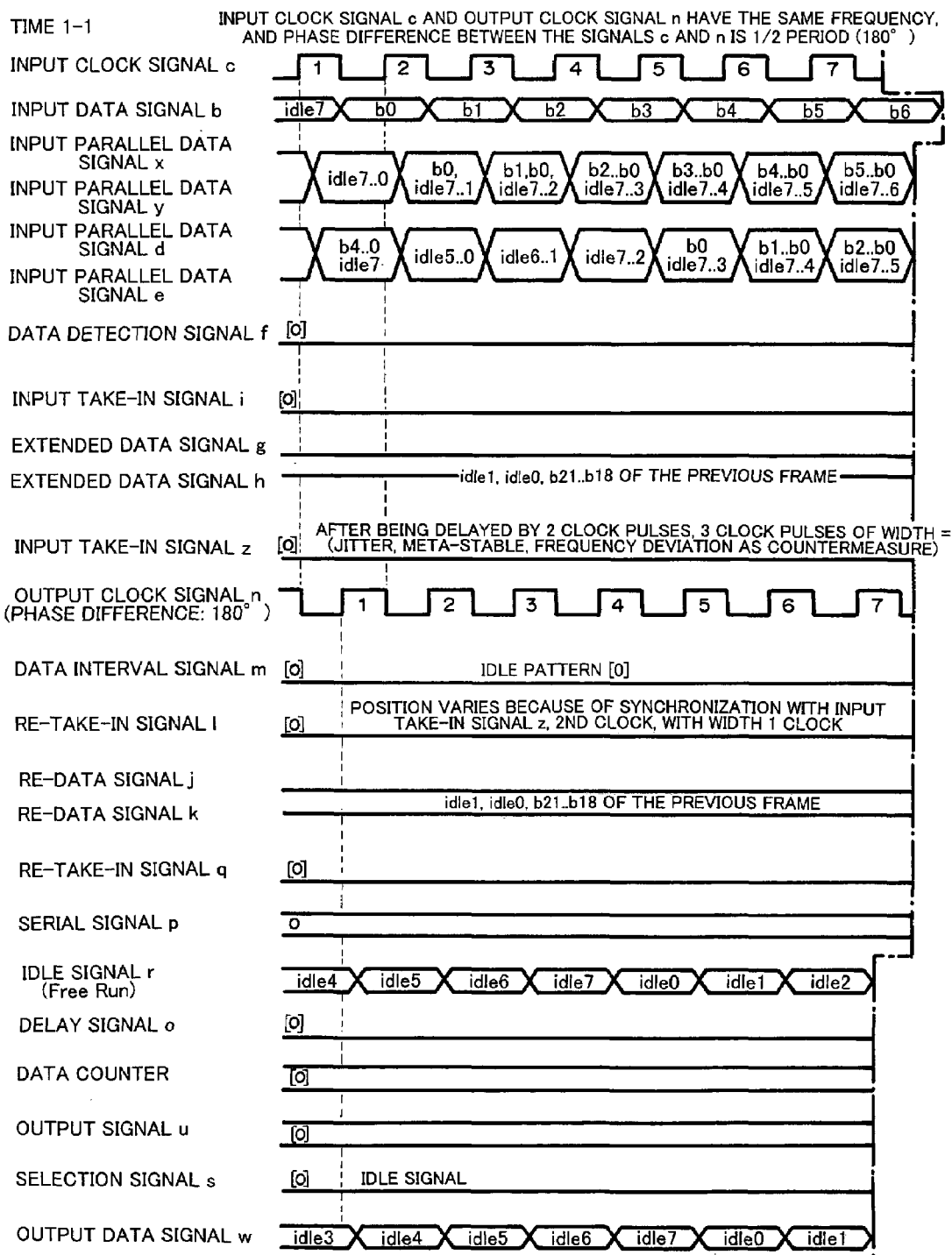

APPARATUS AND METHOD FOR RE-SYNCHRONIZATION OF TRANSMITTED SERIAL SIGNAL OF DATA FRAME AND IDLE PATTERN

BACKGROUND OF THE INVENTION

1. Field of the Invention

The present invention relates to an apparatus and a method for re-synchronization of an input data signal transmitted as a serial signal of a data frame and idle pattern and, more particularly, to a data re-synchronization apparatus for re-synchronizing a high-speed serial signal transmitted over a long distance.

2. Description of the Related Art

In a conventional serial data synchronization system having a decoder and detection circuit connected to the decode, the decoder receives a transmitted serial data at a packet rate, so that the detection circuit monitors a effective data signal sent from the decoder. If the detection circuit confirms that a value of the effective data signal varies at a speed higher than the packet rate, the system asserts an output signal to detect an idle code or data sent in a group or an aggregate having a full-packet size or less, confirms presence of an error, and corrects the error properly, thus synchronizing the input serial data properly (see, for example, JP-A-2002-101084, pages 4 to 6 and FIG. 3).

However, according to this conventional technology, there are disadvantages that, if a high-speed serial signal is transmitted through a fiber channel and so on over a long distance, a lot of jitter occurs in the transmitted signal to prevent a PLL (Phase-Locked Loop) oscillator on a reception side from operating normally.

SUMMARY OF THE INVENTION

An object of the present invention is to provide a data re-synchronization apparatus for suppressing occurrence of a jitter in a high-speed serial signal transmitted over a long distance to improve a reliability of re-synchronized data.

Another object of the present invention is to provide a data re-synchronization method employed in the data re-synchronization apparatus.

According to the present invention, there is provided an apparatus for re-synchronizing an input data signal to be transmitted as a serial signal having a data frame and idle pattern, in which the data frame has a certain length or less and has its start and end positions to be detected, and the idle pattern is transmitted in intervals other than the data frame and has a length of integral times as much as that of a known bit string, comprising:

a clock oscillator configured to generate a reference clock signal;

a first Phase-locked loop oscillator configured to generate an input clock signal synchronized with the input data signal;

a second Phase-locked loop oscillator configured to generate an output clock signal synchronized with the reference clock signal, a frequency of said output clock signal being approximately equal to that of said input clock signal, and a phase of said output clock signal being different from that of said input clock signal;

a serial-parallel converter configured to convert the input data signal into a first parallel data signals of a predetermined number of parallel bits and a second parallel data signals of a predetermined number of idle pattern bits in synchronization with the input clock signal;

an detector configured to detect the data frame and its start and end positions from the second parallel data signals as a data detection signal and a first take-in signal;

a data extension circuit configured to time-axially extend the first parallel data signals by a predetermined clock length in synchronization with the input clock signal in accordance with the first take-in signal, thereby outputting extended data signals of said predetermined number of parallel bits;

a first signal generator configured to generate a second input take-in signal based on the data detection signal;

a second signal generator configured to generate a data interval signal by re-synchronizing the data detection signal with the output clock signal;

a third signal generator configured to generate a re-take-in signal of said predetermined number of parallel bits based on the second input take-in signal;

a data re-synchronizer configured to re-synchronize the extended data signals with the output clock signal to generate re-data signals of said predetermined number of parallel bits;

an idle pattern generator configured to self-generate an idle pattern as an idle signal, judge whether the input data signal is of the idle pattern or the data frame based on the data interval signal, output the self-generated idle signal if the input data signal is of the idle pattern, and output a delay signal and a selection signal if the input data signal is of the data frame;

a parallel-serial converter configured to convert the re-data signals into a serial signal in accordance with the re-take-in signal;

a data delay circuit configured to delay the serial signal in accordance with the delay signal; and a data selector configured to select the idle signal and the delayed signal as an output data signal in accordance with the selection signal.

Preferably, the predetermined number of parallel bits is determined by an absorption of phase difference between the input clock signal and the output clock signal, an avoidance of meta-stability, jitter, and skew, and a an absorption of frequency deviation between the input clock signal and the output clock signal.

Preferably, the predetermined clock length is not less than the number of parallel bits.

Preferably, the frequency of said output clock signal is equal to that of the input clock signal.

Preferably, the frequency of said output clock signal is higher than that of the input clock signal.

According to the present invention, there is provided an apparatus for re-synchronizing an input data signal to be transmitted as a serial signal having a data frame and idle pattern, comprising:

a clock oscillator configured to generate a reference clock signal;

a phase-locked loop oscillator configured to generate an input clock signal synchronized with the input data signal and an output clock signal synchronized with the reference clock signal, a frequency of said output clock signal being approximately equal to that of said input clock signal, and a phase of said output clock signal being different from that of said input clock signal;

a serial-parallel converter configured to convert the input data signal into a first parallel data signals of a predetermined number of parallel bits and a second parallel data signals of a predetermined number of idle pattern bits in synchronization with the input clock signal;

an detector configured to detect the data frame and its start and end positions from the second parallel data signals as a data detection signal;

a data extension circuit configured to time-axially extend the first parallel data signals by a predetermined clock length in synchronization with the input clock signal based on the data detection signal, thereby outputting extended data signals of said predetermined number of parallel bits;

a data re-synchronizer configured to re-synchronize the extended data signals with the output clock signal to generate re-data signals of said predetermined number of parallel bits;

an idle pattern generator configured to self-generate an idle pattern as an idle signal, judge whether the input data signal is of the idle pattern or the data frame based on the data detection signal, output the self-generated idle signal if the input data signal is of the idle pattern, and output a delay signal and a selection signal if the input data signal is of the data frame;

a parallel-serial converter configured to convert the re-data signals into a serial signal in accordance with the re-take-in signal;

a data delay circuit configured to delay the serial signal based on the delay signal; and a data selector configured to select the idle signal and the delayed signal as an output data signal based on the selection signal.

According to the present invention, there is provided a method for re-synchronizing an input data signal to be transmitted as a serial signal having a data frame and idle pattern, in which the data frame has a certain length or less and has its start and end positions to be detected, and the idle pattern is transmitted in intervals other than the data frame and has a length of integer times as much as that of a known bit string, comprising the steps of:

generating a reference clock signal;

generating an input clock signal synchronized with the input data signal;

generating an output clock signal synchronized with the reference clock signal, a frequency of said output clock signal being about equal to that of said input clock signal, and a phase of said output clock signal is different from that of said input clock signal;

converting the input data signal into a first parallel data signals of a predetermined number of parallel bits and a second parallel data signals of a predetermined number of idle pattern bits in synchronization with the input clock signal;

detecting the data frame and its start and end positions from the second parallel data signals as a data detection signal and a first take-in signal;

time-axially extending the first parallel data signals by a predetermined clock length in synchronization with the input clock signal in accordance with the first take-in signal, thereby outputting extended data signals of said predetermined number of parallel bits;

generating a second input take-in signal based on the data detection signal;

generating a data interval signal by re-synchronizing the data detection signal with the output clock signal;

generating configured to generate a re-take-in signal of said predetermined number of parallel bits based on the second input take-in signal;

re-synchronizing the extended data signals with the output clock signal to generate re-data signals of said predetermined number of parallel bits;

self-generating an idle pattern as an idle signal, judge whether the input data signal is of the idle pattern or the data frame based on the data interval signal, output the self-generated idle signal if the input data signal is of the idle pattern, and output a delay signal and a selection signal if the input data signal is of the data frame;

converting the re-data signals into a serial signal in accordance with the re-take-in signal;

delaying the serial signal in accordance with the delay signal; and selecting the idle signal and the delayed signal as an output data signal in accordance with the selection signal.

A first effect of the present invention is that a jitter can be prevented from increasing due to long-distance transmission of a high-speed serial signal. This is because data can be output by re-synchronizing a signal synchronized with the input clock signal with an output clock signal that has about the same frequency but has a different phase, at a high reliability.

A second effect is that reliabilities of re-synchronized data can be improved. This is because a signal whose voltage level is attenuated due to an increased jitter can be subject to waveform shaping and sent to a next stage.

BRIEF DESCRIPTION OF THE DRAWINGS

FIGS. 2A and 2B are a timing chart of "time 1-1" in the data re-synchronization apparatus related to the embodiment;

DESCRIPTION OF THE PREFERRED EMBODIMENTS

The following will describe in detail embodiments of the present invention with reference to drawings.

Figure 1A:
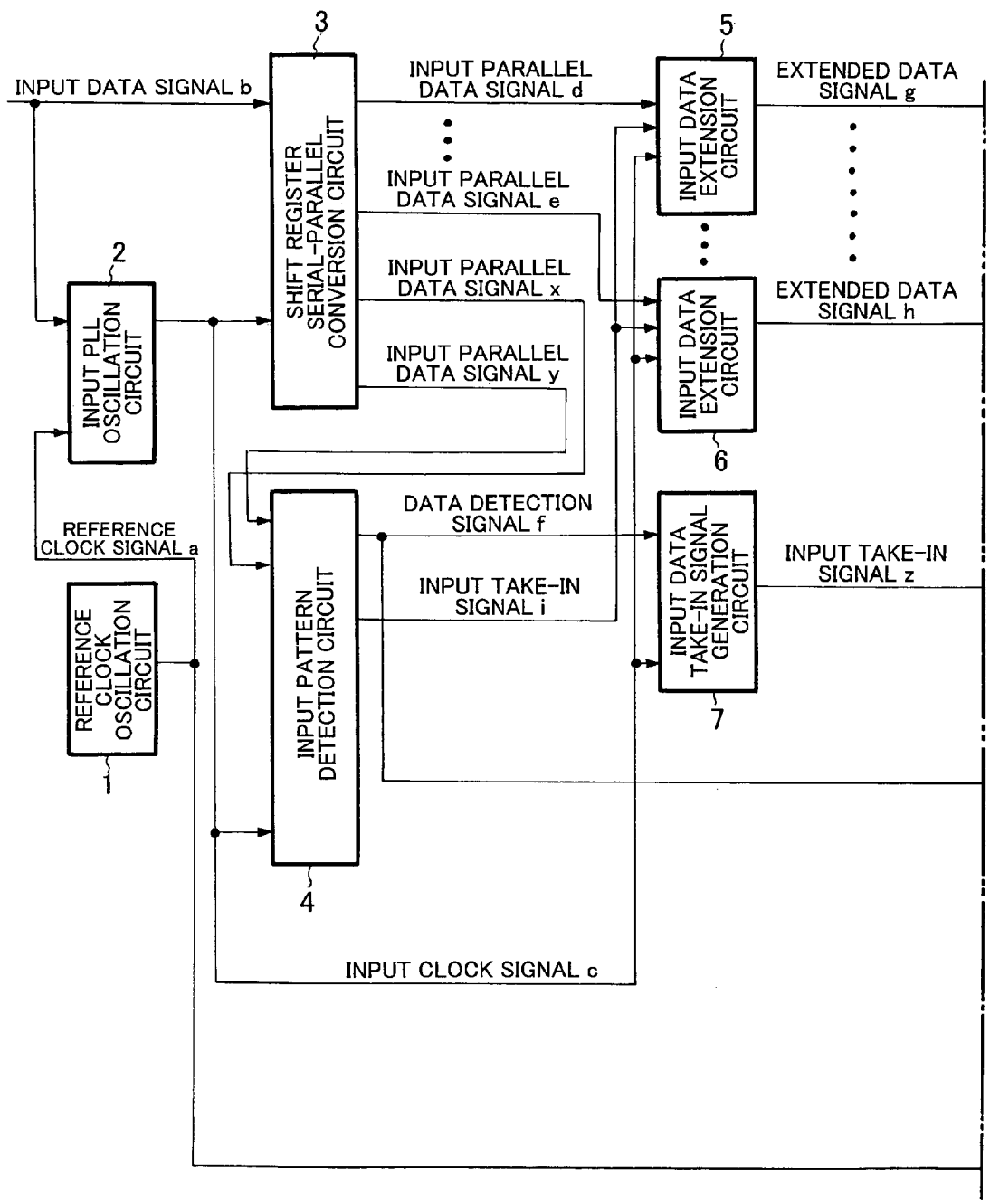
FIGS. 1A and 1B are a circuit block diagram for showing a configuration of a data re-synchronization apparatus related to an embodiment of the present invention.
Figure 1B:
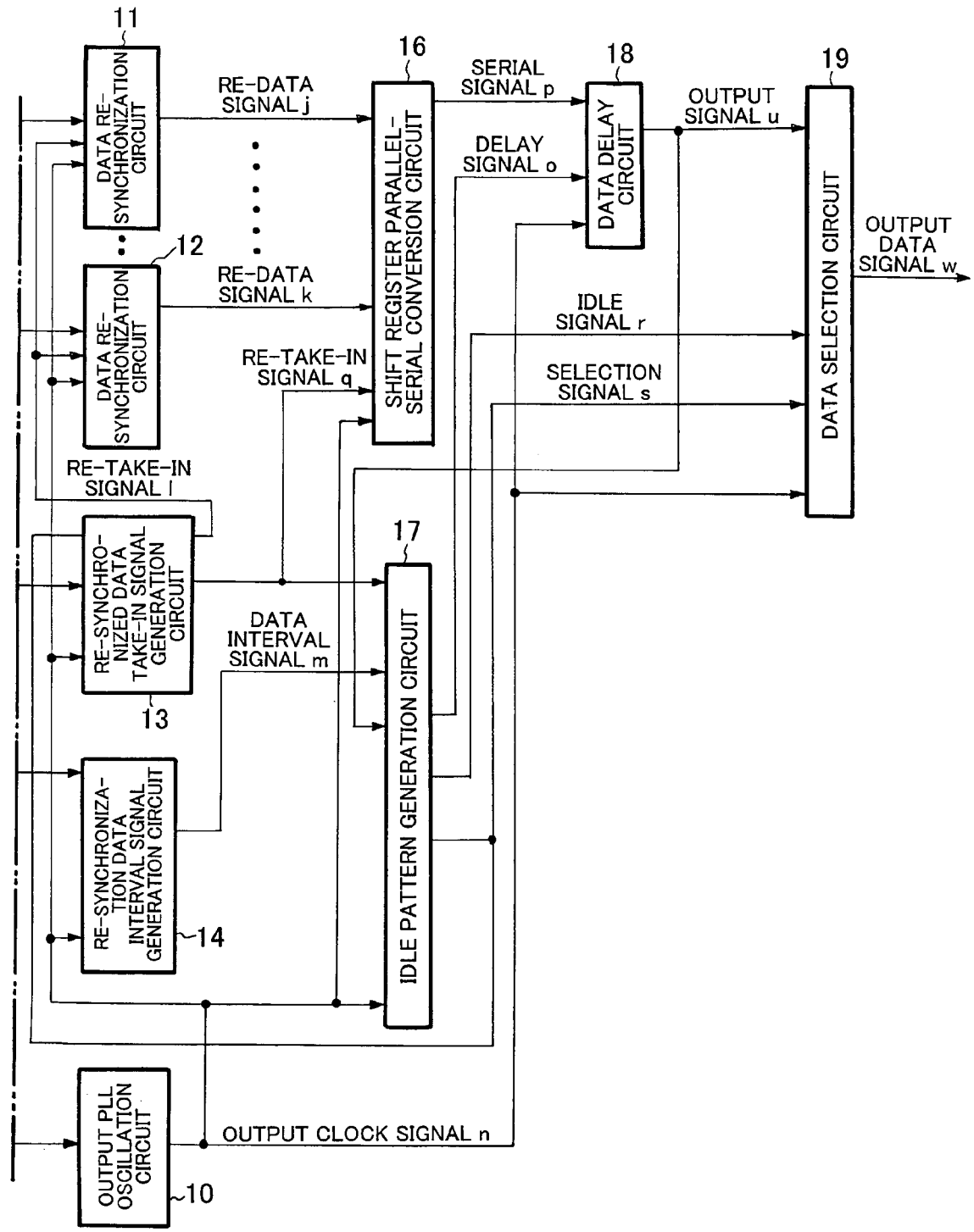
Figure 2B:
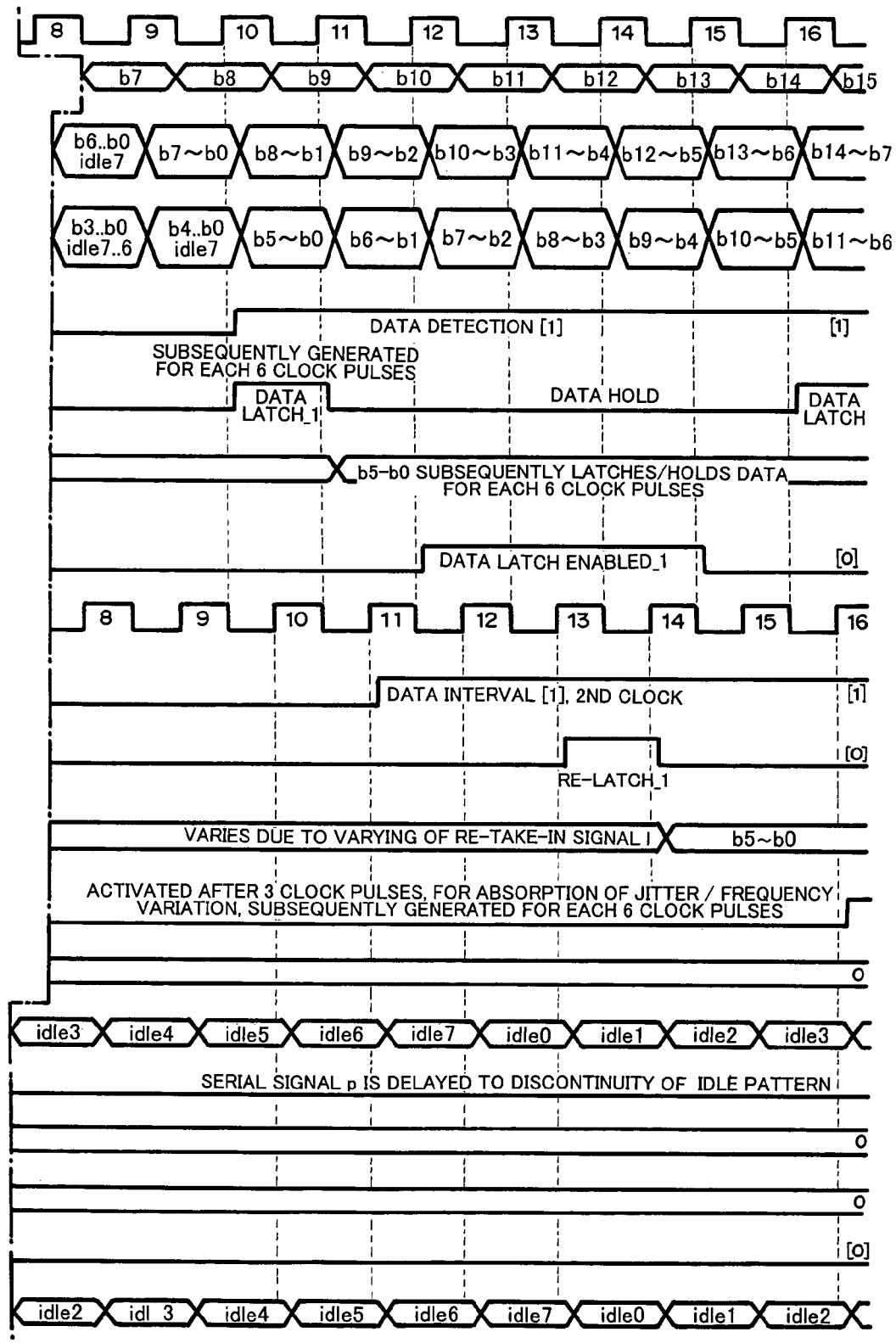
Figure 3A:
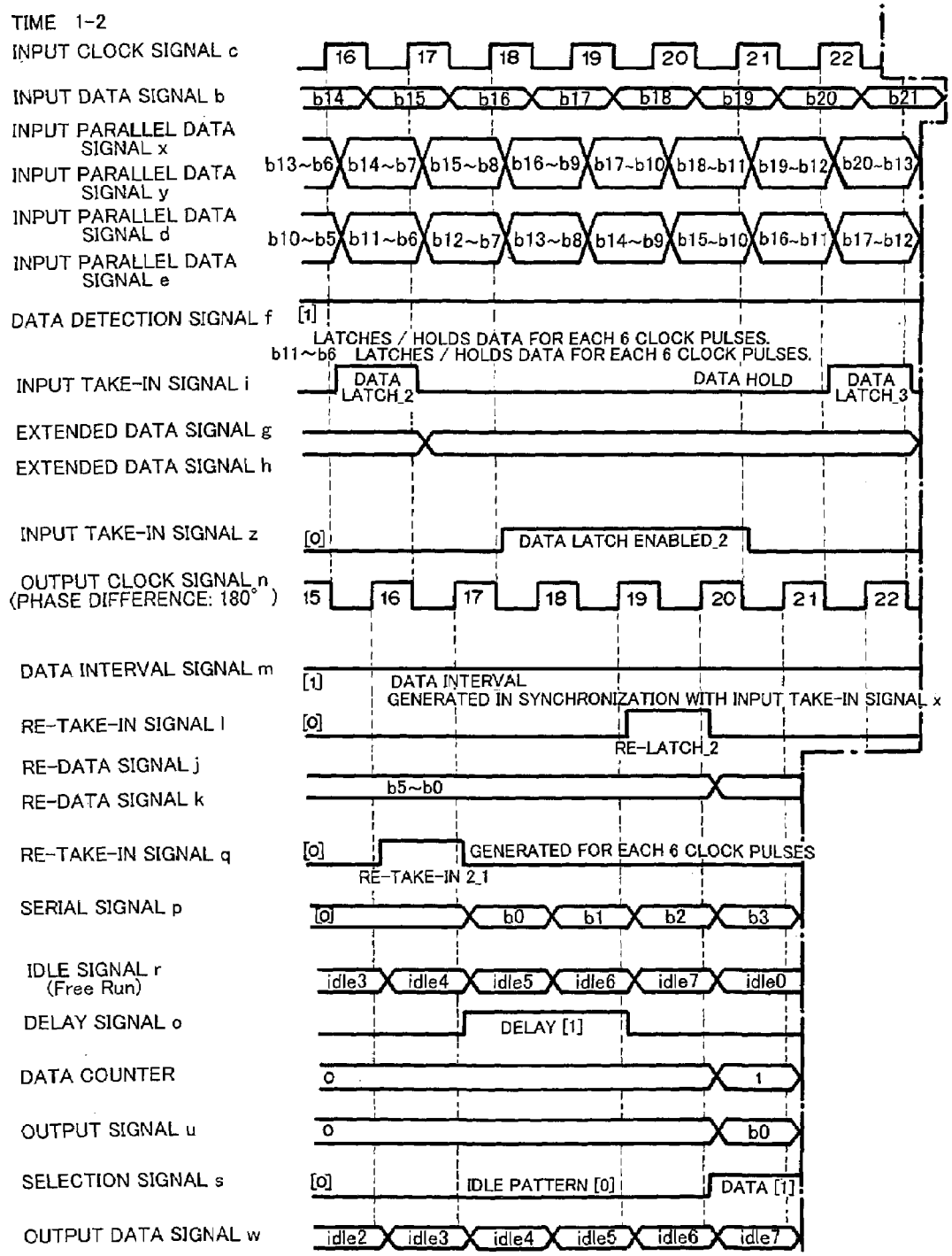
FIGS. 3A and 3B are a timing chart of "time 1-2" in the data re-synchronization apparatus related to the embodiment.
Figure 3B:
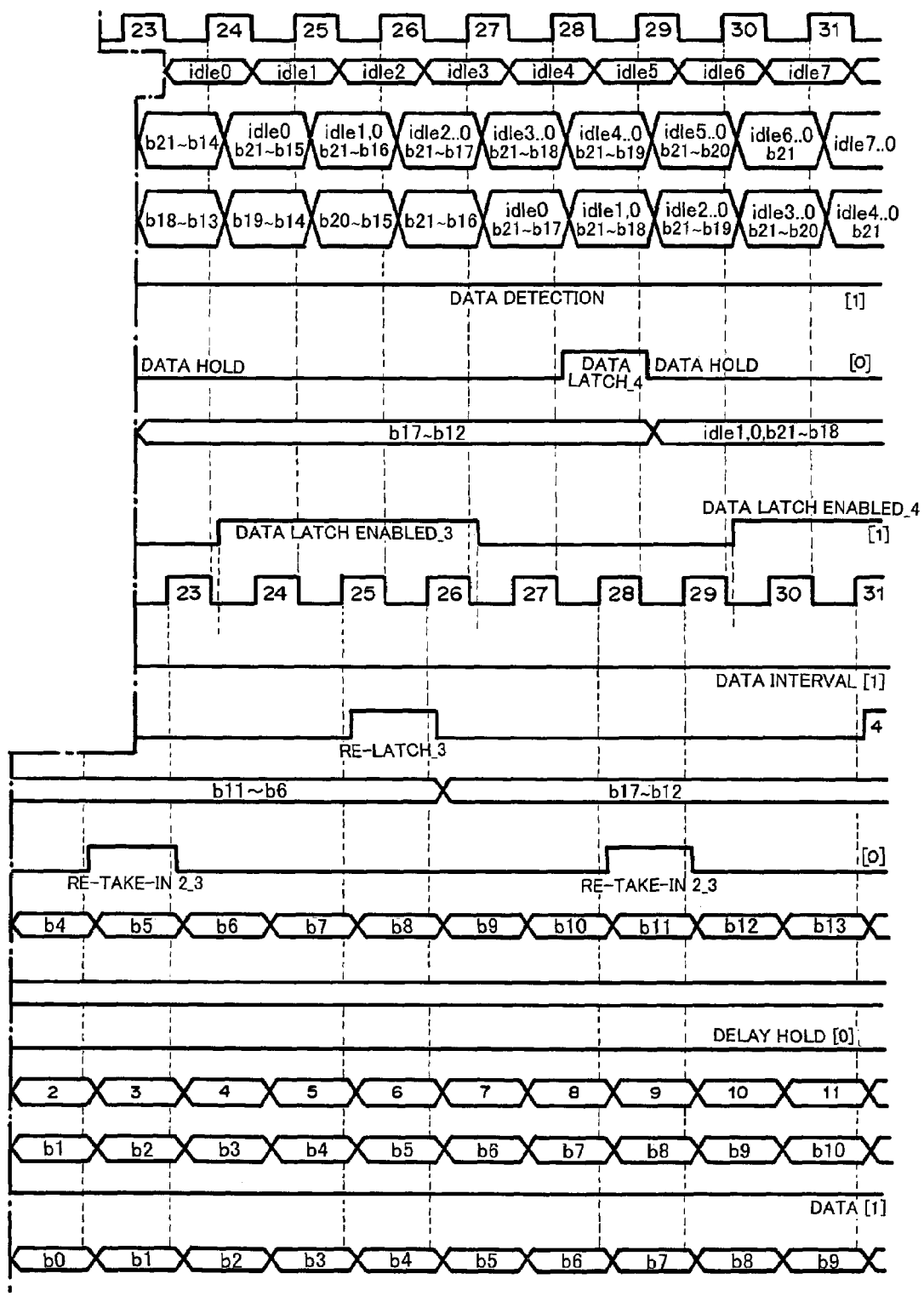
Figure 4A:
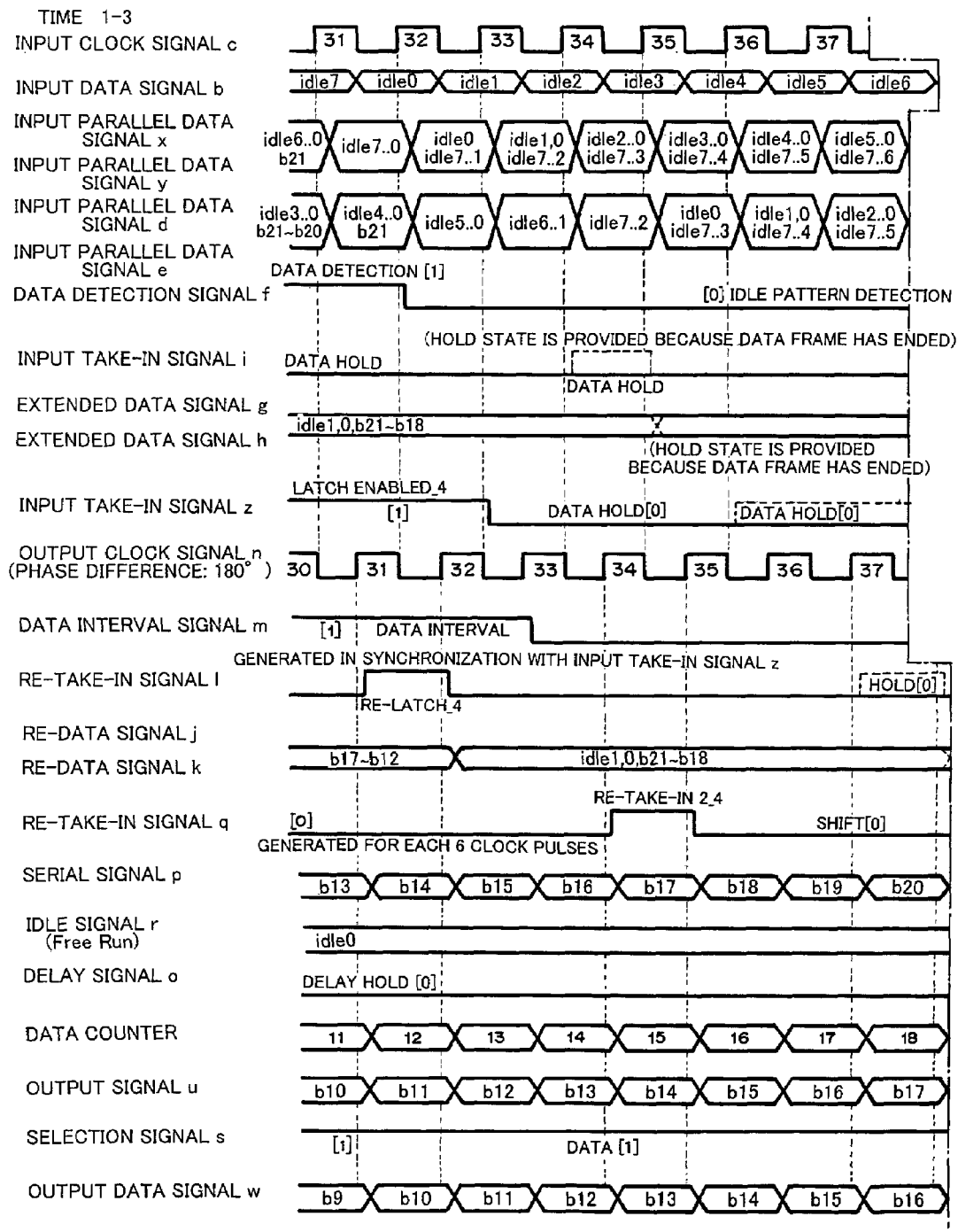
FIGS. 4A and 4B are a timing chart of "time 1-3" in the data re-synchronization apparatus related to the embodiment.
Figure 4B:
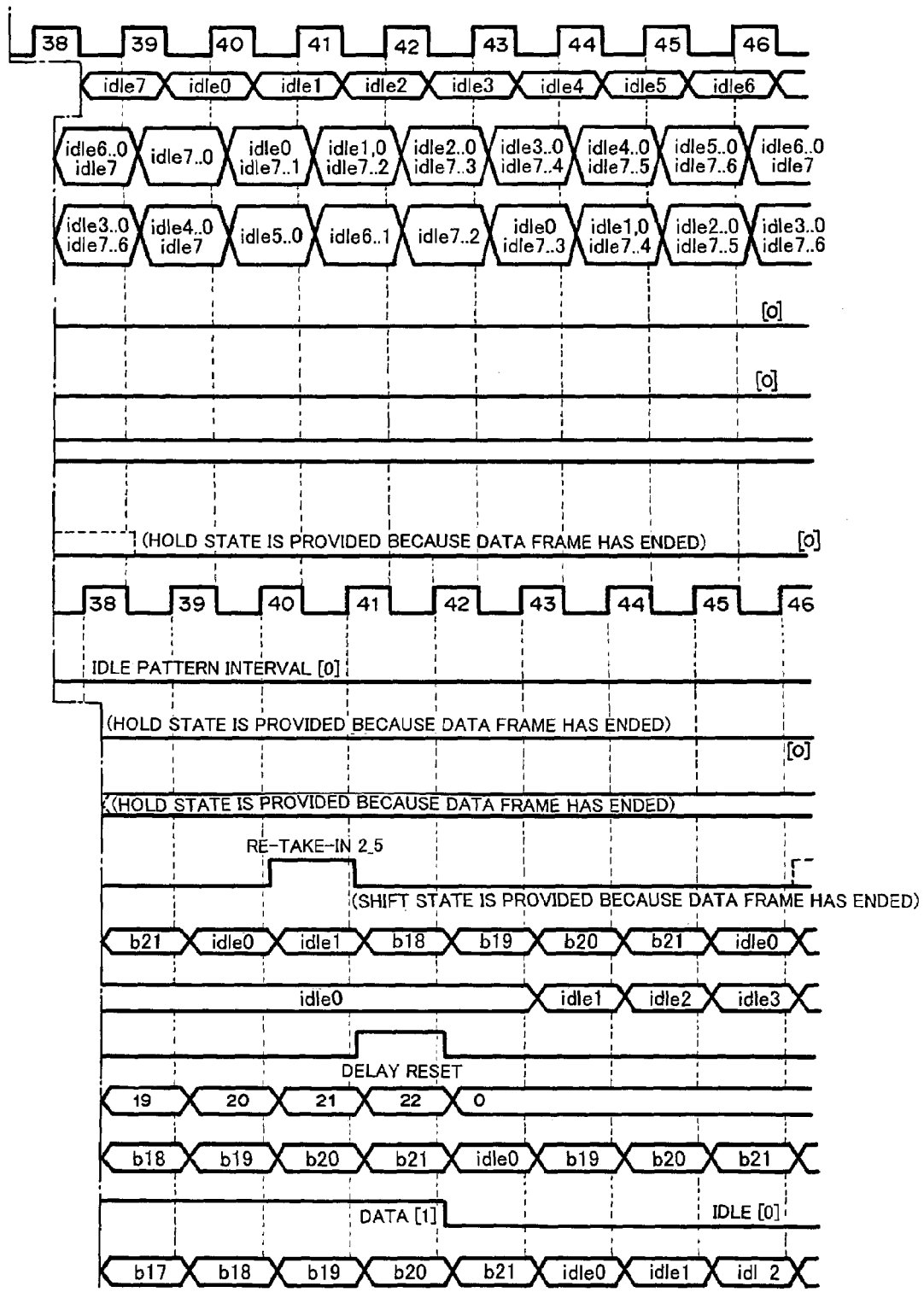
Figure 5A:
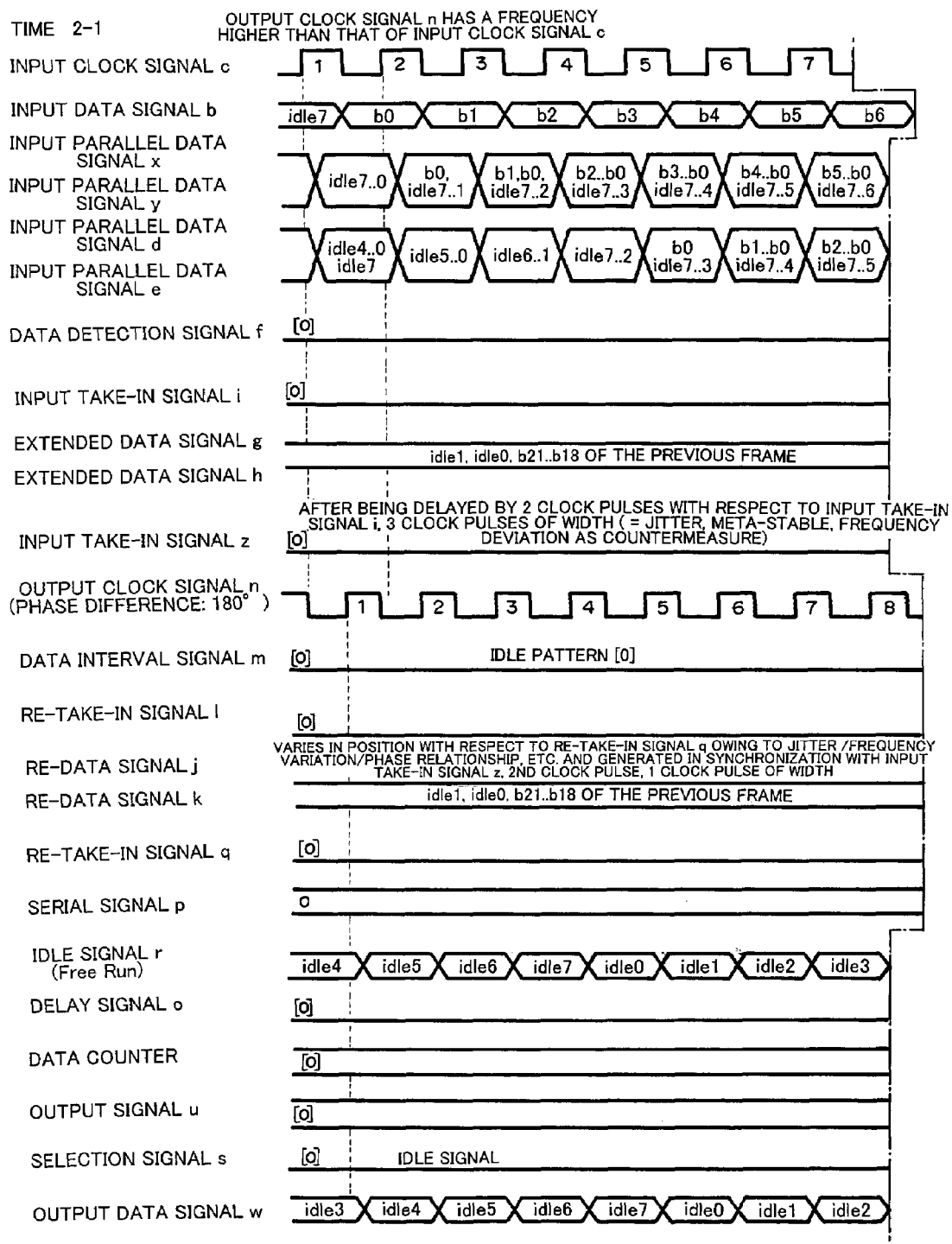
FIGS. 5A and 5B are a timing chart of "time 2-1" in the data re-synchronization apparatus related to the embodiment.
Figure 5B:
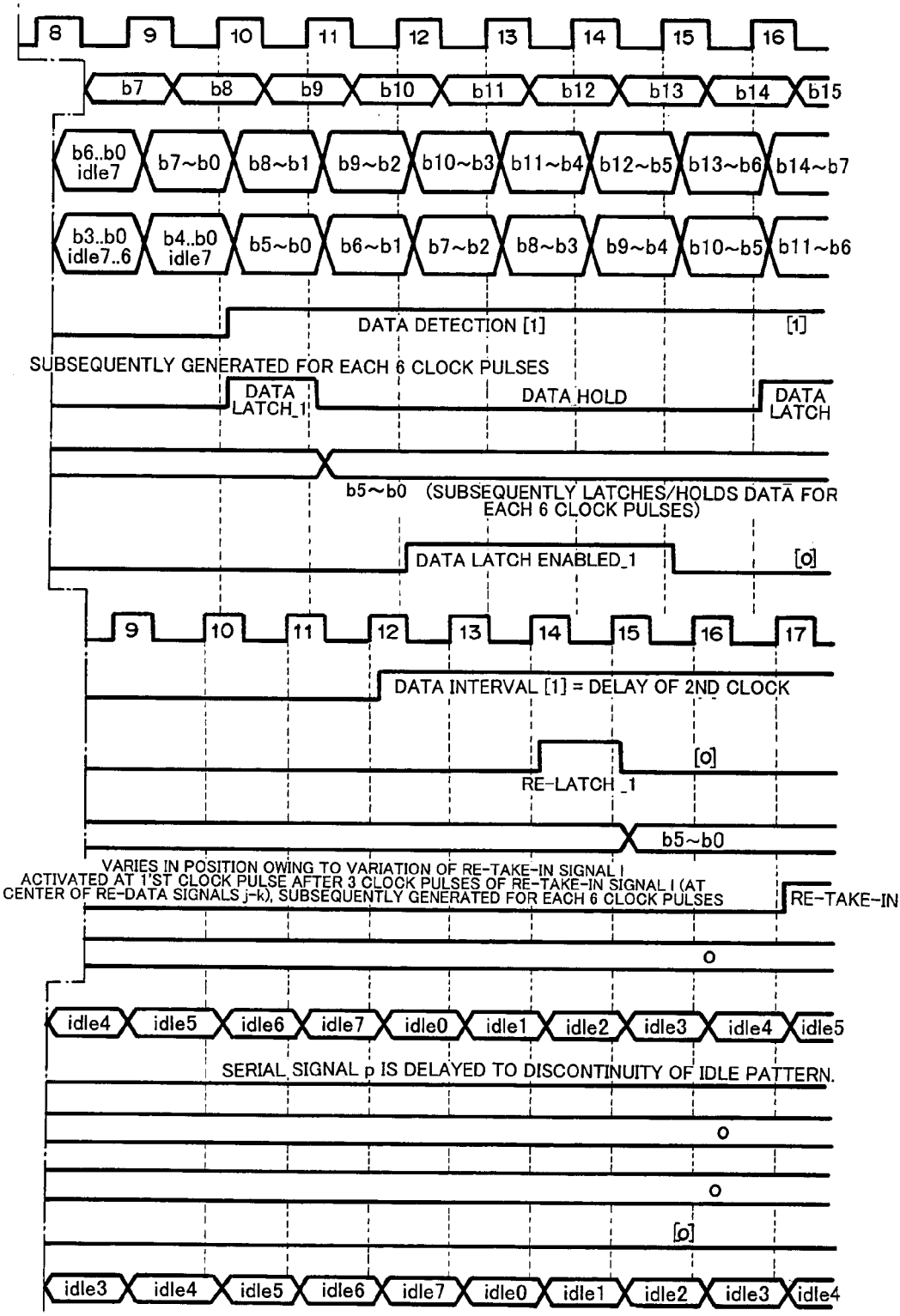
Figure 6A:
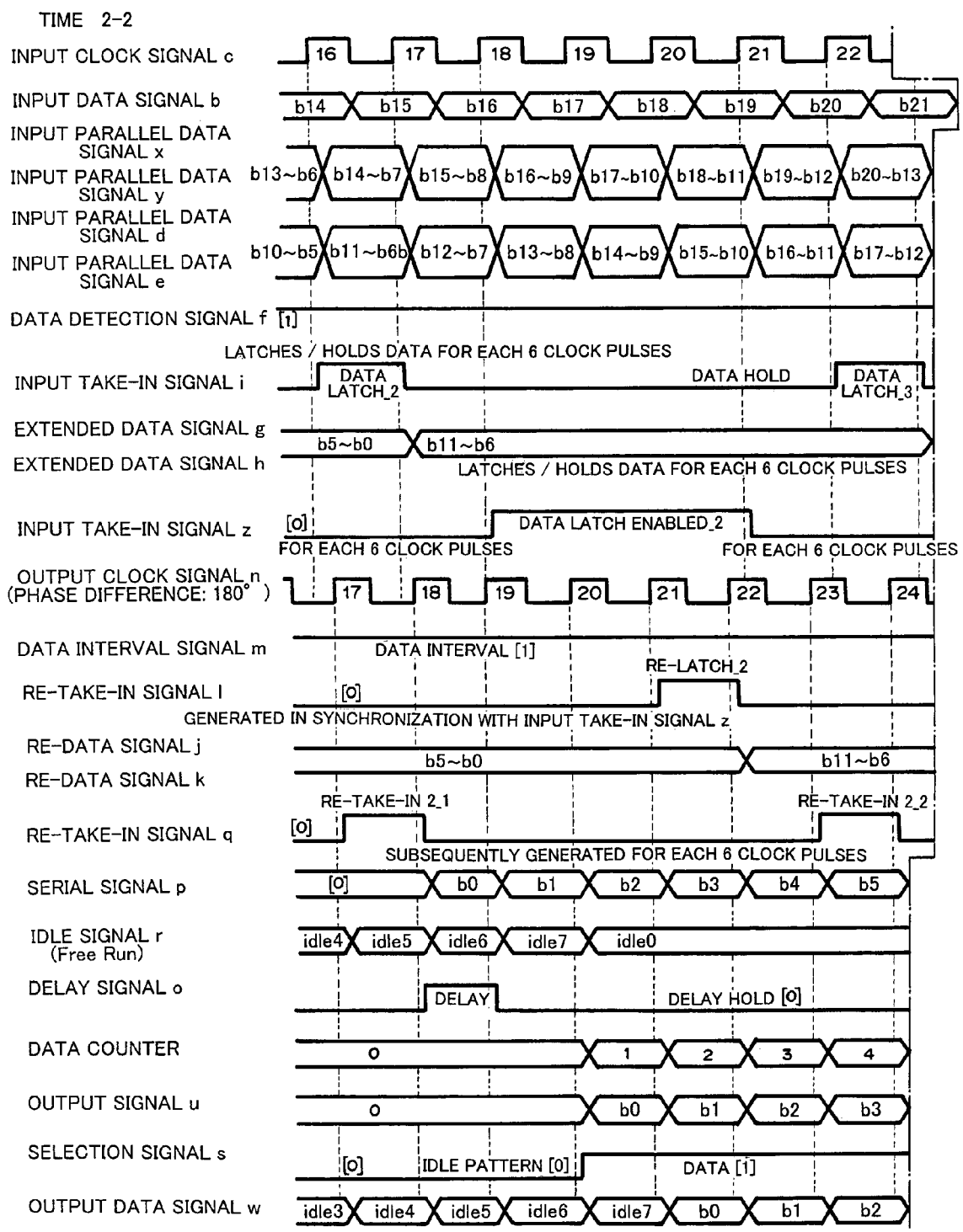
FIGS. 6A and 6B are a timing chart of "time 2-2" in the data re-synchronization apparatus related to the embodiment.
Figure 6B:
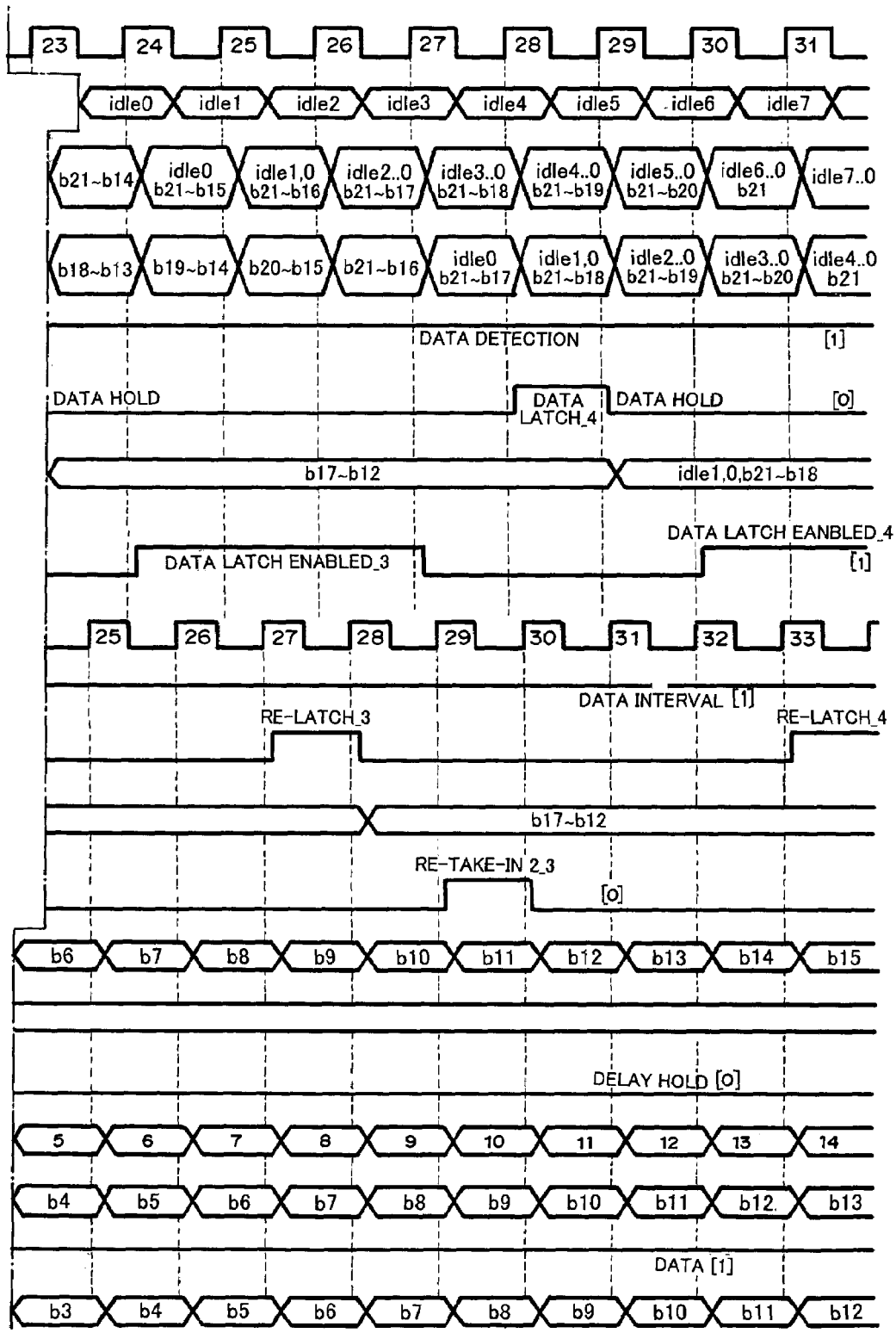
Figure 7A:
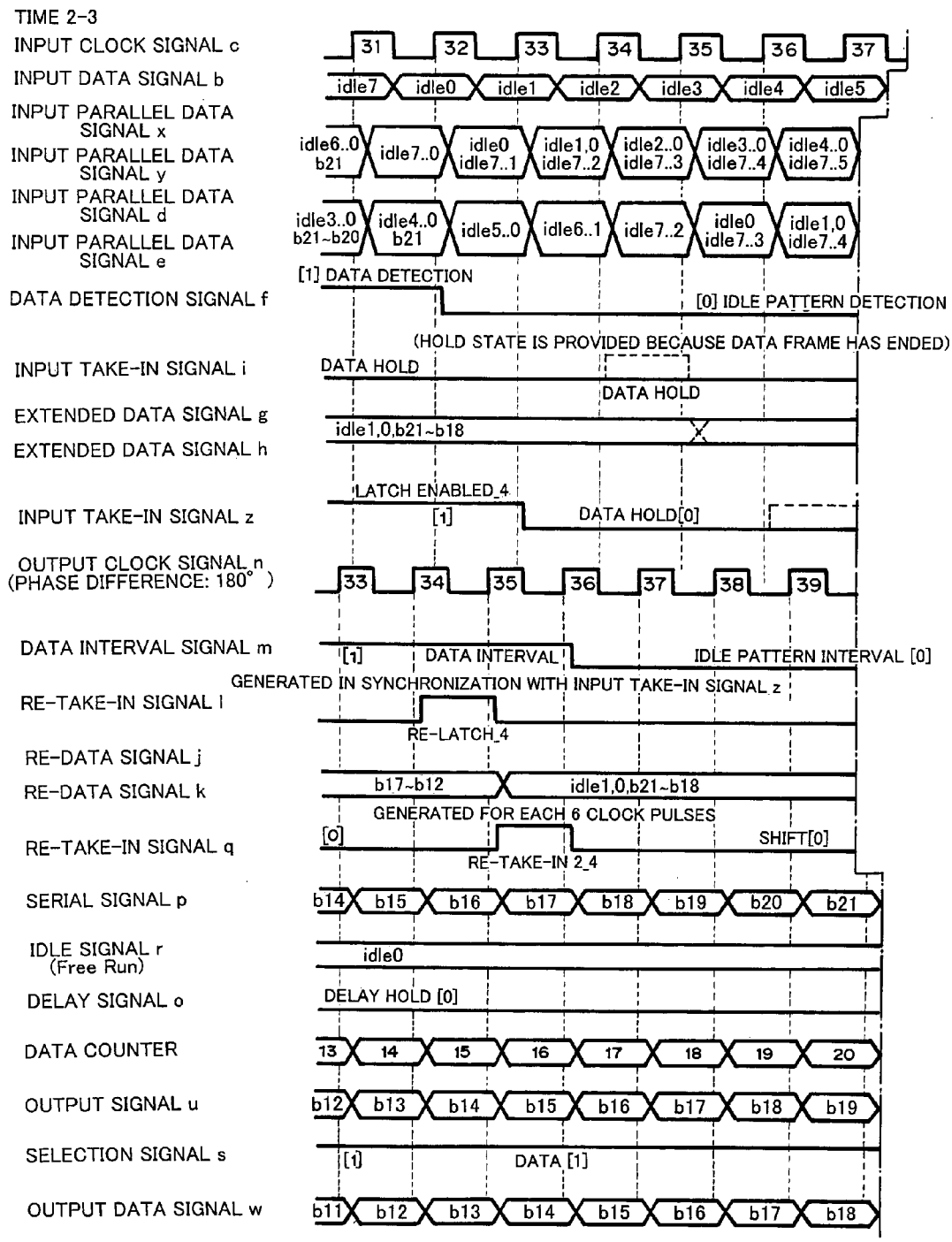
FIGS. 7A and 7B are a timing chart of "time 2-3" in the data re-synchronization apparatus related to the embodiment.
Figure 7B:
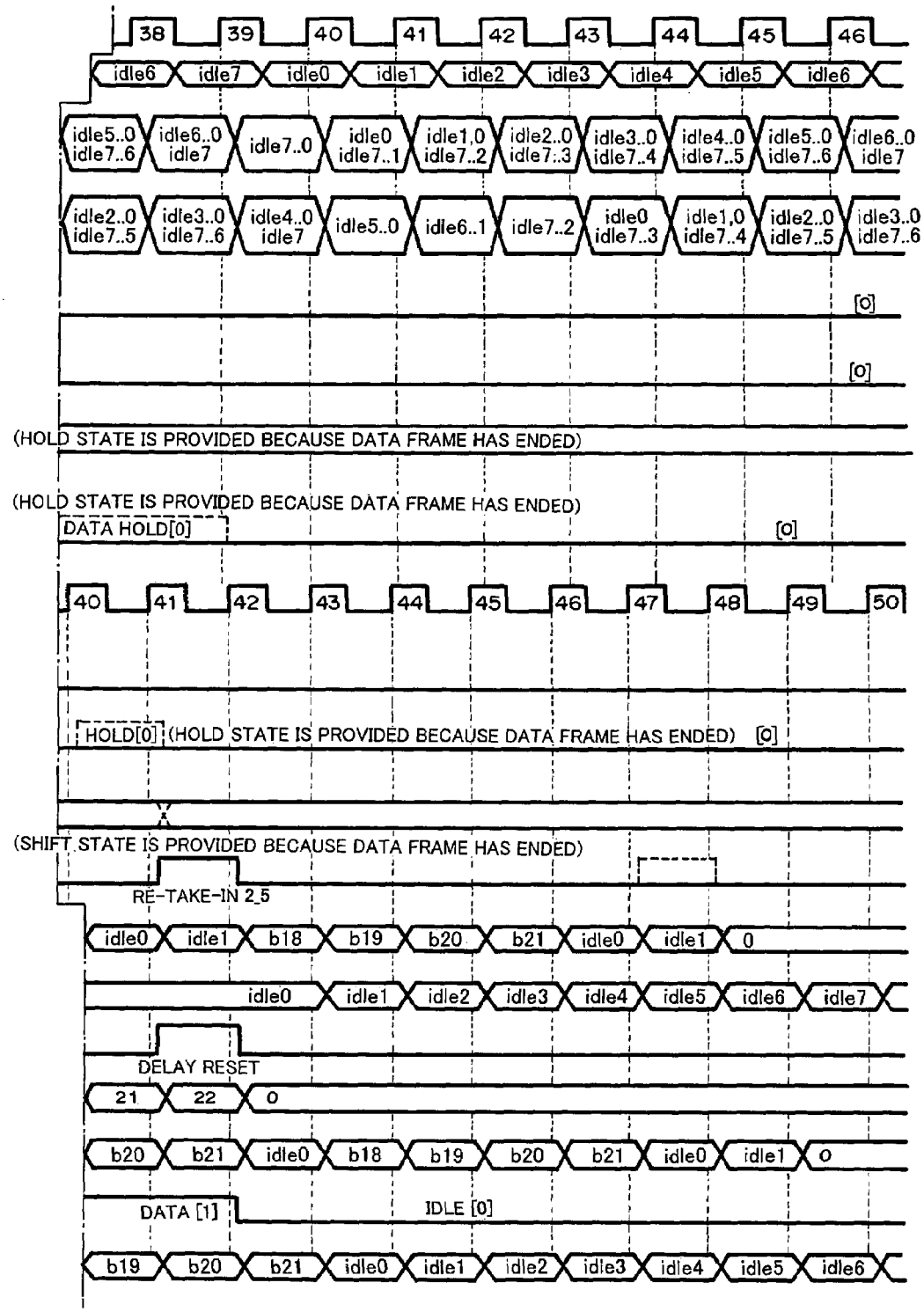

As shown in FIGS. 1A and 1B, a data re-synchronization apparatus related to the embodiment of the present invention comprises: a reference clock oscillation circuit 1; an input PLL (Phase-Locked Loop) oscillation circuit 2; a shift register serial-parallel conversion circuit 3; an input pattern detection circuit 4; input data extension circuits 5–6 of a predetermined number of parallel bits; an input data take-in signal generation circuit 7; an output PLL (Phase-Locked Loop) oscillation circuit 10; data re-synchronization circuits 11–12 of a predetermined number of parallel bits; a re-synchronized data take-in signal generation circuit 13; a re-synchronized data interval signal generation circuit 14; a shift register parallel-serial conversion circuit 16; an idle pattern generation circuit 17; a data delay circuit 18; and a data selection circuit 19.

In the apparatus as shown in FIGS. 1A and 1B, an input data signal b, which is a serial signal, is transmitted and input to the serial-parallel conversion circuit 3. The input data signal b is parallelized in synchronization with an input clock signal c output from the input PLL oscillation circuit 2 to generate input parallel data signals d–e of a predetermined number of parallel bits by the serial-parallel conversion circuit 3. In synchronization with the input clock signal c, the input parallel data signals d–e are extended as much as a predetermined clock length along a time axis by the input data extension circuits 5–6, and then is output as extended data signals g–h of a predetermined number of parallel bits. Theses signals are extended by as much as allowance made for a phase difference between the input clock signal c and an output clock signal n to be output from the output PLL oscillation circuit 10, a meta-stable, a jitter, a skew, and a frequency deviation between the input clock signal c and the output clock signal n.

Next, the extended data signals g–h are taken in again at the vicinity of a center of variation points thereof, and are re-synchronized with the output clock signal n to generate re-data signals j–k of a predetermined number of parallel bits by the data re-synchronization circuits 11–12. This take-in position varies. The re-data signals j–k are re-synchronized so as not to "swing" again and are serialized to generate a serial signal p by the parallel-serial conversion circuit 16. Subsequently, by the data delay circuit 18, an output signal u is generated from the serial signal p in synchronization with a discontinuity of an idle pattern as an idle signal r self-generated by idle pattern generation circuit 17. The output signal u and the self generated idle signal r are selected based on a selection signal s from the idle pattern generation circuit 17 to be output as an output data signal w by data selection circuit 19.

FIGS. 2A and 2B, 3A and 3B, and 4A and 4B show timing charts of "time 1-1 to 1-3" in the data re-synchronization apparatus related to the present embodiment. It is to be noted that the timing charts of "time 1-1 to 1-3" of FIGS. 2A and 2B, 3A and 3B, and 4A and 4B show a case where a frequency of the input clock signal c and that of the output clock signal n are approximately the same as each other. As can be seen from FIGS. 2A and 2B, 3A and 3B, 4A and 4B, in the present embodiment, it is supposed that a data frame length of the input data signal b has a certain value or less and is already known, specifically, when no data is flowing to the input data signal b, the idle signals r (idle0 to idle7) flow in eight-bit units and data of the data frame has twenty-two data bits of b0 to b21.

More specifically, in the present embodiment, it is necessary to satisfy three terms: (1) absorption of phase difference between the input clock signal c and the output clock signal n; (2) avoidance of meta-stable, jitter, and skew; and (3) absorption of frequency deviation between the input clock signal c and the output clock signal n.

First, to satisfy the first two terms, it is necessary that absorption of phase difference between the input clock signal c and the output clock signal n is ±1 bit or less in case of the first term, and that avoidance of meta-stable, jitter, and skew is ±1 bit or less in case of the second term. That is, a total of four bits are necessary: two bits to allow for "delay" and another two bits to allow for "advancing".

Next, as for the third term, it is supposed that "data is extended to six bits" in the present embodiment. Therefore, up to "six bits of swing" can be absorbed, so that the third term can be absorbed as much as a remainder obtained by subtracting the four bits capable for satisfying the first and second terms from the six bits. That is, the third term can be satisfied as much as 6−4=2 (bits). Therefore, frequency deviation between the input clock signal c and the output clock signal n in the third term is less than ±1 bit or less, that is, a variation less than two bits can be absorbed to provide a margin of less than two bits. Therefore, a predetermined clock length is set to six bits, which is a total sum of the absorption of phase difference between the input clock signal c and the output clock signal n<±1 bits in the first term, the avoidance of meta-stable+jitter+skew<±1 bit in the second term, and the absorption of frequency deviation between the input clock signal c and the output clock signal n<±1 bit in the third term.

If it is supposed that a frequency variation ratio of the input clock signal c=±1% and that of the output clock signal n=±1%, a frequency deviation ratio between the input clock signal c and the output clock signal n=±2%. If a maximum data frame length ("fixed length") that can absorb a frequency difference is set to α number of bits, a relationship of (α number of bits)*(4%)<(2 bits<−margin of (3)) must be satisfied. This is because if the data frame length is longer than that, a time-axial swing near the end of a data division exceeds a margin of the third term. This relationship is solved to give a relationship of α number of bits <50 bits. Then, this value is quantized (rounded off) into a "fixed length" of the present embodiment=49 bits.

Furthermore, the input data signal b needs to a signal which clearly shows a start position and an end position of a data frame. That is, in order to perform an operation to "start to take in data aiming at a center of a data string (six bits) incoming first", it is necessary to know "start position". Further, since "an idle pattern generated internally needs to be output as synchronized with an end of data", it is necessary to know "end position". If the signal is such that the "start position" is not known, a data take-in timing cannot be known; if the signal is such that the "end position" is not known, an idle pattern generated internally cannot be output as synchronized with it.

FIGS. 5A and 5B, 6A and 6B, and 7A and 7B show timing charts of "time 2-1 to 2-3" in the data re-synchronization apparatus related to the present embodiment. It is to be noted that the timing charts of "time 2-1 to 2-3" of FIGS. 5A and 5B, 6A and 6B, and 7A and 7B show, as a reference, a case where the frequency of an input clock signal c is higher than that of the output clock signal n. A frequency ratio between the input clock signal c and the output clock signal n is about 11:12 over "time 2-1 to 2-3".

The reference clock oscillation circuit 1 outputs a reference clock signal a, which provides a reference, to the input PLL oscillation circuit 2 and the output PLL oscillation circuit 10.

The input PLL oscillation circuit 2 generates the input clock signal c synchronized with the input data signal b and outputs it to the shift register serial-parallel conversion circuit 3, the input pattern detection circuit 4, the input data extension circuits 5–6, and the input data take-in signal generation circuit 7. Normally, the input PLL oscillation circuit 2 operates as synchronized not with the reference clock oscillation circuit 1 but with the input data signal b. Therefore, an idle pattern is always sent even when no data is given. If a circuit that outputs the input data signal b fails and so the input data signal b has no incoming data, the input PLL oscillation circuit 2 abnormally functions. If such a failure occurs, the input PLL oscillation circuit 2 does not recover until power is turned OFF or may be destroyed in the worst case. To guard against this, if the input data signal b fails, in order to avoid failure/destruction, the circuit 2 is synchronized, in oscillation, with the reference clock oscillation circuit 1 that is oscillating mostly without fail.

As described in the paragraph given below, the shift register serial-parallel conversion circuit 3 is constituted of a nine-bit shift register. This circuit 3 parallelizes the input data signal b which is a serial signal, outputs input parallel data signals d–e of a predetermined number of parallel bits to the input data extension circuits 5–6 of a predetermined number of parallel bits as re-synchronized data signals, and outputs input parallel data signals x–y of a predetermined number of idle pattern bits to the input pattern detection circuit 4 for the purpose of detecting an input data pattern. The input parallel data signals x–y of a predetermined number of idle pattern bits are eight-bit shift register outputs, where an idle pattern is supposed to have an eight-bit length. Further, the input parallel data signals d–e of a predetermined number of parallel bits are six-bit shift register outputs, where a predetermined clock length for data-extension is supposed to be six bits. The input parallel data signals d–e are supposed to hold data that is one bit earlier than the input parallel data signals x–y.

An example of configuration of shift register serial-parallel conversion circuit 3, in which the input parallel data signals x–y and d–e are shifted downward respectively, is as follows:

|  |  |  |  |
|---|---|---|---|
| new data | | bit8 = x | |
| 2nd new | data | bit7 = . | |
| | data | bit6 = . | |
| | data | bit5 = ., | d |
| | data | bit4 = ., | . |
| | data | bit3 = ., | . |
| | data | bit2 = ., | . |
| | data | bit1 = y, | . |
| old | data | bit0 = | e |

The input pattern detection circuit 4 detects a data frame as well as a start position and an end position of the data frame from the input parallel data signals x–y of the number of idle pattern bits, outputs a data detection signal f to the input data take-in signal generation circuit 7 and the re-synchronized data interval signal generation circuit 14, generates an input take-in signal i which determines timing for taking in the input parallel data signals d–e, and outputs the signal i to the input data extension circuits 5–6. In order to detect an end/start of an idle pattern, the input pattern detection circuit 4 needs to know beforehand what bit configuration the idle pattern has and how many bits it has. Further, it has to generate the signal for itself, so that the bit pattern and the length need to be known. The timing charts of FIGS. 2A and 2B, 3A and 3B, 4A and 4B, 5A and 5B, 6A and 6B, and 7A and 7B do not explicitly specify logic 0 and logic 1 to give versatility, thus describing "idle0", "idle1", "idle2", "idle3", "idle4", "idle5", "idle6", and "idle7". Actually, however, idle patterns of data determined (agreed upon) by interface specifications such as a bit string "10110110" or "11001101" flow consecutively as a repetition of "for example, an aggregate of eight bits".

The input data extension circuits 5–6 take in the input parallel data signals d–e each time the input take-in signal i goes active, to output extended data signals g–h to the respective data re-synchronization circuits 11–12. The extended data signals g–h are a six-bit flip-flop output that operates in synchronization with the input clock signal c and take in, only once, the input parallel data signals d–e into (predetermined clock length)*(input clock signal c) according to the input take-in signal i, to extend the input data signal b time-axially as much as the predetermined clock length and hold it.

The input data extension circuits 5–6 extend the parallelized input parallel data signals d–e time-axially as much as a lapse of time (predetermined clock length) that allows for a frequency difference between the input PLL oscillation circuit 2 and the output PLL oscillation circuit 10, a jitter of the input PLL oscillation circuit 2, and a collision of an active edge of the input clock signal c of the input PLL oscillation circuit 2 and that of the output clock signal n of the output PLL oscillation circuit 10. Although the predetermined clock length is six bits according to the present embodiment, a predetermined clock length actually required for extension must allow for (1) phase difference between the input clock signal c and the output clock signal n<±1 bit (which falls in a range of "less than ±1 bit"), (2) meta-stable+ jitter+skew<±1 bit (which also falls in a range of "less than ±1 bit" because peripheral circuits also operate at a higher speed as a transfer rate increases), and (3) frequency deviation between the input clock signal c and the output clock signal n<±1 bit (which requires the following calculation to work out).

If it is assumed that a frequency variation ratio of the input clock signal c is ±a % (which is ±1% according to the present embodiment and typically is ±0.01%) and that of the output clock signal n is ±b % (which is ±1% according to the present embodiment and typically is ±0.01%), it is derived that a frequency deviation ratio between the input clock signal c and the output clock signal n is ±(a+b)% (which is ±2% according to the present embodiment and typically is ±0.02%) and a data frame length is c number of bits (which is 22 bits according to the present invention and typically is supposed to be 2070 bytes=16560 bits of various possible values). When data is flowing, a shift starts to develop between the input clock signal c and the output clock signal n, so that a shift at the end of the data flow becomes "data frame length"*"frequency deviation ratio between the input clock signal c and the output clock signal n"=c*{2*(a+b)} (which is, according to the present embodiment, 22 bits*{2*(1%+1%)}=0.88 bit=>rounded up (to a multiple of 2 because of "delay" and "advancing" though)=>2 bits, typically, 16560 bits*{2*(0.01%+0.01%)}=6.624 bits=>rounded up (to a multiple of 2 because of "delay" and "advancing" though)=>8 bits. Therefore, it is 2+2+2=6 bits by the present embodiment, and typically (which takes on various values though) is 2+2+8=12 bits.

Further, it is necessary to provide stages (the parallel bits) of each of the input data extension circuits 5–6 as many as a value of a predetermined extension clock length. According to the present embodiment, the length is extended to six bits, so that "six stages" are necessary. If the number of the stages is insufficient, data drops out, whereas if it is excessive, extra data enters (which case does not matter by ignoring an excess in the amount of data). It is given in the input parallel data signals d–e as "idle5 . . . 0" (six bits) in the timing chart of "time 1-1" shown in FIGS. 2A and 2B.

When the data detection signal f goes active, the input data take-in signal generation circuit 7 generates in each constant interval an input take-in signal z to transfer timing for take-in of the parallelized input parallel data signals d–e of the number of parallel bits to a circuit on the downstream side that operates in synchronization with the output clock signal n having different timing and outputs it to the re-synchronized data take-in signal generation circuit 13. The input take-in signal z goes active at a moment that is one clock pulse later than the variation points of the extended data signals g–h of the number of parallel bits in order to take in the extended data signals g–h of the number of parallel bits in synchronization with the output clock signal n without fail and stays active over three clock pulses, allowing for a phase difference between the input clock signal c and the output clock signal n, a meta-stable, a jitter, a skew, a frequency deviation between the input clock signal c and the output clock signal n, etc.

The output PLL oscillation circuit 10 generates the output clock signal n synchronized with the reference clock signal a and outputs it to the data re-synchronization circuits 11–12 of the number of parallel bits, the re-synchronized data take-in signal generation circuit 13, the re-synchronized data interval signal generation circuit 14, the shift register parallel-serial conversion circuit 16, the idle pattern generation circuit 17, the data delay circuit 18, and the data selection circuit 19. Since the output PLL oscillation circuit 10 oscillates in synchronization with the reference clock oscillation circuit 1, the input clock signal c and the output clock signal n have different phases and frequencies.

The data re-synchronization circuits 11–12 of the number of parallel bits are each constituted of a six-bit flip-flop that operates in synchronization with the output clock signal n, to re-synchronize the extended data signals g–h of the number of parallel bits with the output clock signal n and delay the re-synchronized data signals until data output is enabled as observing the current output signal state and then output re-data signals j–k of the number of parallel bits to the shift register parallel-serial conversion circuit 16. That is, the data re-synchronization circuits 11–12 of the number of parallel bits re-synchronize the extended-data signals g–h of the number of parallel bits and that are extended six-fold in synchronization with the input clock signal c with the output clock signal n at a position indicated by the re-take-in signal 1 (at roughly the center of the variation points of the extended data signals g–h of the number of parallel bits), to output the re-synchronized data signals j–k of the number of parallel bits to the shift register parallel-serial conversion circuit 16.

The re-synchronized data take-in signal generation circuit 13, according to the input take-in signal z, outputs the re-take-in signal 1 to the data re-synchronization circuits 11–12 of the number of parallel bits so that data may be taken in at timing synchronized with the output clock signal n having a phase different from that of the input clock signal c and also that is time-wise placed at a center of the extended data signals g–h of the number of parallel bits, which are extended time-axially. Similarly, the re-synchronized data take-in signal generation circuit 13 outputs a re-take-in signal q to the shift register parallel-serial conversion circuit 16 and the idle pattern generation circuit 17. Specifically, the re-synchronized data take-in signal generation circuit 13 re-shapes the input take-in signal z synchronized with the input clock signal c in synchronization with the output clock signal n and goes active at a position that is distant from the input take-in signal z by as much as (2*output clock signal n) so that data may be taken in at roughly the center of the variation points of the extended data signals g–h of the number of parallel bits, thereby generating thee-take-in signal 1 to output it to the data re-synchronization circuits 11–12 of the number of parallel bits. The re-take-in signal 1 swings in time-axial position in order to re-shape the signal synchronized with the input clock signal c by using the output clock signal n having the different phase/frequency. Further, the re-synchronized data take-in signal generation circuit 13 generates the re-take-in signal q, which is a "punch-out signal that will not swing", so that the "swingy" re-data signals j–k may not swing and outputs it to the shift register parallel-serial conversion circuit 16 and the idle pattern generation circuit 17. In order to enable taking in data properly even if the re-take-in signal 1 swings, the re-take-in signal q is generated in a period that lasts (1* output clock signal n) from a position that is delayed from the re-take-in signal 1 by as much as (3*output clock signal n) so that the data may be placed at roughly the center of the variation points of the re-data signals j–k of the number of parallel bits.

If it detects an end position of a data frame based on the data detection signal f that operates in synchronization with the input clock signal c, the re-synchronized data interval signal generation circuit 14 re-shapes the data detection signal f by using the output clock signal n and generates a data interval signal m so that the data frame may be switched to an idle pattern and outputs it to the idle pattern generation circuit 17.

The shift register parallel-serial conversion circuit 16 takes in the "swingy" re-data signals j–k of the number of parallel bits in synchronization with the "non-swingy" re-take-in signal q (at roughly the center of the re-data signals j–k of the number of parallel bits), serializes them into a serial signal p, and outputs it to the data delay circuit 18.

The idle pattern generation circuit 17 outputs to the data selection circuit 19 an idle pattern as a self-generated idle signal r until the idle pattern becomes a data frame, to inactivate a selection signal s and output it to the re-synchronized data take-in signal generation circuit 13 and the data selection circuit 19. Further, the idle pattern generation circuit 17 outputs to the data delay circuit 18 a delay signal o that delays the serial signal p so that data may be output from a discontinuity of the idle patterns and activates the selection signal s at proper timing to output it to the data selection circuit 19. The idle pattern generation circuit 17 outputs an idle pattern it has self-generated for itself if the input data signal b is of an idle pattern and, when the input signal b has turned to be of a data frame, outputs the delay signal o and the selection signal s, which are a timing signal for transferring. Specifically, the idle pattern generation circuit 17 generates the idle data pieces idle0 to idle7 in free run to output the idle signal r to the data selection circuit 19 until a data frame having b0 to b21 is detected and, when the data frame starts to be output, outputs the idle data idle0 to the data selection circuit 19 and, when the data ends, generates the idle data pieces idle0 to idle7 again in free run to output them to the data selection circuit 19. Further, for exact transferring from the idle pattern to the re-synchronized data, the idle pattern generation circuit 17 generates the delay signal o that causes the serial signal p to wait until the idle7 of the idle pattern is output completely and outputs it to the data delay circuit 18. Furthermore, the idle pattern generation circuit 17 generates the selection signal s that switches the idle pattern and the re-synchronized data from each other and outputs it to the re-synchronized data take-in signal generation circuit 13 and the data selection circuit 19. It is to be noted that the idle signal r, if carrying no data, generates "idle0", "idle1", "idle2", "idle3", "idle4", "idle5", "idle6", and "idle7" repeatedly. Since a first bit of data begins from a bit next to the "idle7" for sure, it is known that a length of an idle pattern is integral times as much as that of a known bit string.

The data delay circuit 18, in order to provide smooth connection from an idle pattern to a data frame, delays the serial signal p according to the delay signal o to work out proper timing for transferring from each other the idle pattern and the serial signal p, which is a serialized data signal generated asynchronously with the idle pattern and provide an output signal u to the data selection circuit 19 and the idle pattern generation circuit 17. That is, in order to output the serial signal p in synchronization with a discontinuity of the idle signal r, the data delay circuit 18 delays the serial signal p when data is flowing to the serial signal p in a period when the delay signal o is active, to hold a resultant delay and provide the output signal u to the data selection circuit 19 and the idle pattern generation circuit 17 at a discontinuity of the idle signal r.

The data selection circuit 19 transfers with each other an idle pattern it has generated for itself and a serialized data signal generated asynchronously with it, to provide an output data signal w. That is, the data selection circuit 19 provides the idle signal r when the selection signal s is inactive and provides the output signal u and the output data signal w when the selection signal s is inactivated.

The following will describe operations of the data re-synchronization apparatus related to the embodiment having such a configuration. The description is made with reference to the clock diagram shown in FIG. 1 and the timing charts of the "time 1-1 to 1-3" shown in FIGS. 2A and 2B, 3A and 3B, and 4A and 4B.

In intervals other than an interval of the data frame (b0 to b21), the idle signal r (free run) (idle0 to idle7) generated at the idle pattern generation circuit 17 is output as delayed by as much as (1*output clock signal n) to the output data signal w via the data selection signal 19 (output clock signal n_1 etc.).

The shift register serial-parallel conversion circuit 3 parallelizes the input data signal b at a leading edge of the input clock signal c, to output the input parallel data signals d–e of the number of parallel bits and the input parallel data signals x–y of the number of idle pattern bits (input clock signal c_1 and the subsequent).

When the input parallel data signals x–y of the number of idle pattern bits become b0–b7 and are confirmed not to be of an idle pattern, the input pattern detection circuit 4 activates the data detection signal f (input clock signal c_10).

Further, simultaneously, the input pattern detection circuit 4 activates the input take-in signal i only over a period of (1*input clock signal c) (input clock signal c_10).

From this moment onward, the input take-in signal i is activated (input clock signals c_16, 22, and 28) only over a period of (1*input clock signal c) for each period of (6*input clock signal c) until the data frame ends and the idle pattern is detected again (input clock signal c_34).

When the input take-in signal i is activated, the input data extension circuits 5–6 of the number of parallel bits take in the input parallel data signals d–e using the next input clock signal c (input clock signals c_11, 17, 23, and 29) and output the extended data signals g–h of the number of parallel bits to the data re-synchronization circuits 11–12 (input clock signal c_11 etc.).

The input data extension circuits 5–6 of the number of parallel bits hold the extended data signals g–h of the number of the parallel bits, over a period when the input take-in signal i is inactive (input clock signals c_12 to 16 etc.).

Further, when the data detection signal f is activated, the input data take-in signal generation circuit 7 activates the input take-in signal z over a period of (3* input clock signal c) from a position delayed by as much as (2*input clock signal c) (input clock signals c_12 through c_14 etc.). From this moment onward, the input take-in signal z is activated over a period of (3*input clock signal c) for each period of (6*input clock signal c). To re-shape the input take-in signal z synchronized with the input clock signal c by using the output clock signal n having different phase and frequency in order to generate a re-take-in signal l securely, a width of (3*input clock signal c) is provided so that an edge collision, an jitter, a skew, a frequency deviation, etc. of the clock signals may be avoided.

When the data detection signal f is activated, the re-synchronization data interval signal generation circuit 14 activates the data interval signal m as delayed by as much as (2*output clock signal n) (output clock signal n_11).

When the input take-in signal z is activated (input clock signal c_12 etc.), the data take-in signal generation circuit 13 activates the re-take-in signal l only over a period of (1*output clock signal n) as delayed by as much as (2*output clock signal n), that is, roughly at the center of the variation points of the extended data signals g–h of the number of parallel bits (output clock signals n_13, n_19, n_25, and n_31).

When the re-take-in signal l is activated (output clock signal n_13 etc.), the data re-synchronization circuits 11–12 of the number of parallel bits take in the extended data signals g–h of the number of parallel bits as delayed by as much as (1*output clock signal n) and output the re-data signals j–k of the number of parallel bits to the shift register parallel-serial conversion circuit 16 (output clock signal n_14 etc.).

Over a period when the re-take-in signal l is inactive (output clock signal n_14 etc.), the data re-synchronization circuits 11–12 of the number of parallel bits hold their values (output clock signals n_15 through n_19 etc.).

When the re-take-in signal l is inactivated (output clock signal n_13 etc.), the re-synchronized data take-in signal generation circuit 13 activates the re-take-in signal q only over a period of (1*output clock signal n) at a position delayed by as much as (3*output clock signal n), that is, roughly at the center of the variation points of the re-data signals j–k of the number of parallel bits. From this moment onward, the re-synchronized data take-in signal generation circuit 13 activates the re-take-in signal q only over a period of (1*output clock signal n) for each period of (6*output clock signal n).

When the re-take-in signal q is activated (output clock signal n_16 etc.), the shift register parallel-serial conversion circuit 16 takes in the re-data signals j–k of the number of parallel bits at a position delayed by (1*output clock signal n), serializes them into the serial signal p, and outputs it to the data delay circuit 18 (output clock signal n_17 etc.).

When the re-take-in signal q is activated, the idle pattern generation circuit 17 activates the delay signal o at a position delayed by (1*output clock signal n) (output clock signal n_17).

The idle pattern generation circuit 17 activates the delay signal o until the idle6 (output clock signal n_18), which is a discontinuity of the idle signal r, ends after the re-take-in signal q is output for the first time and inactivates the delay signal o at the idle7 (output clock signal n_19).

The data delay circuit 18 delays the serial signal p over a period when the delay signal o is active (output clock signal n_18) after the re-take-in signal q is activated once (output clock signal n_16) and, when the delay signal o is inactivated (output clock signal n_19), outputs as the output signal u the serial signal p delayed with respect to the next output clock signal n (output clock signal n_20) (output clock signals n_20 and the subsequent). Further, the delay circuit 18 holds the delay value over a period when data frames are output.

The idle pattern generation circuit 17 counts data pieces of a data frame of the output signal u. Further, the idle pattern generation circuit 17 activates the selection signal s when the output clock signal n (output clock signal n_20) appears first after the delay signal o is inactivated (output clock signal n_20 and the subsequent).

When the selection signal s is activated (output clock signal n_20 and the subsequent), the idle signal r of the idle pattern generation circuit 17 holds the idle0 (output clock signal n_20 and the subsequent).

The data selection circuit 19 outputs the idle signal r in a period when the selection signal s is inactive (output clock signals n_1 through n_19) and, (1*output clock signal n) later, outputs the output data signal w; when the selection signal s is activated (output clock signals n_20 and the subsequent), it outputs the output signal u having incoming data and, (1*output clock signal n) later, outputs the output data signal w (output clock signal n_21 and the subsequent). That is, the input data signal b synchronized with the input clock signal c is re-synchronized with the output clock signal n, to output the output data signal w.

If an idle pattern is detected in the input parallel data signals x–y of the number of idle pattern bits (input clock signal c_32), the input pattern detection circuit 4 decides that the data frame has ended and inactivates the data detection signal f (input clock signal c_32). Further, if an idle pattern is detected in the input parallel data signals x–y of the number of idle pattern bits (input clock signal c_32), the input pattern detection circuit 4 inactivates input take-in signal i too (input clock signal c_34).

Since the input take-in signal i is thus inactivated (input clock signal c_34), the extended data signals g–h of the number of parallel bits, which are outputs of the input data extension circuit 5–6 of the number of parallel bits, hold as they are the idle1 and idle10 and b21–b18, which are previously latched data (input clock signal c_35 and the subsequent).

Similarly, since the data detection signal f is inactivated (input clock signal c_34 and the subsequent), the input take-in signal z, which is an output of the input data take-in signal generation circuit 7, is also inactivated (input clock signal c_36 and the subsequent).

Since the input take-in signal z is inactivated (input clock signal c_36 and the subsequent), the re-take-in signal 1, which is an output of the re-synchronized data take-in signal generation circuit 13, is also inactivated (output clock signal n_37 and the subsequent).

Since the re-take-in signal 1 is inactivated (output clock signal n_37 and the subsequent), the re-data signals j–k of the number of parallel bits, which are outputs of the data re-synchronization circuits 11–12 of the number of parallel bits, hold the idle1 and idle10 and b21–b18 that are previously latched data (output clock signal n_38 and the subsequent).

Since the data detection signal f is inactivated (output clock signal c_34 and the subsequent), the data interval signal m, which is an output of the re-synchronized data interval signal generation circuit 14, is inactivated (output clock signal n_35 and the subsequent).

When "all data pieces" are counted completely (22 bits) (output clock signal n_42) at the idle pattern generation circuit 17 after the data interval signal m is inactivated (output clock signal n_35 and the subsequent), the selection signal s, which is an output of the idle pattern generation circuit 17, is inactivated (output clock signal n_42 and the subsequent).

When the selection signal s is inactivated (output clock signal n_42), the idle pattern generation circuit 17 starts to generate the idle patterns idle0 through idle7, to output the idle signal r (output clock signal n_42).

When the selection signal s is inactivated (output clock signal n_42), the re-synchronized data take-in signal generation circuit 13 inactivates the re-take-in signal q (output clock signal n_46 and the subsequent).

When a data count becomes 21 (output clock signal n_40), the idle pattern generation circuit 17 outputs to the data delay circuit 18 the delay signal o that reduces a delay to 0 (output clock signal n_41), to reset a delay of the data delay circuit 18, so that a signal obtained by delaying the serial signal p by as much as (1*output clock signal n) is output as the output signal u to the data selection circuit 19 and the idle pattern generation circuit 17 (output clock signal n_43 and the subsequent).

When the selection signal s is inactivated (output clock signal n_42), the data selection circuit 19 outputs the idle signal r to the output data signal w starting from a position where the next output clock signal n appears (output clock signal n_43 and the subsequent).

By performing these operations, the present apparatus can output an idle pattern it has generated for itself as the idle signal r when the serial signal p has no data frames and, when it has an incoming data frame, output the input data signal b as re-synchronized with the output clock signal n in synchronization with a discontinuity of the idle signal r and, when the data frame has run out, output an idle pattern it has generated for itself as the idle signal r at a discontinuity of the data frame.

Note here that operations, shown in the timing charts of "time 2-1 through 2-3" shown in FIGS. 5A and 5B, 6A and 6B, and 7A and 7B performed in a case where the output clock signal n has a frequency higher than that of the input clock signal c are roughly the same as those performed in the above-described case of the timing charts of "time 1-1 through 1-3" shown in FIGS. 2A and 2B, 3A and 3B, and 4A and 4B and so their detailed description is omitted.

By the present embodiment, a data re-synchronization apparatus can be constituted of circuit blocks that have the functions described above, to output data by re-synchronizing a signal synchronized with the input clock signal c with the output clock signal n that has about the same frequency but has a different phase, at a high reliability. That is, it is possible to shape a waveform of a signal whose voltage level is attenuated due to an increased jitter.

What is claimed is:

1. An apparatus for re-synchronizing an input data signal to be transmitted as a serial signal having a data frame and idle pattern, in which the data frame has a certain length or less and has its start and end positions to be detected, and the idle pattern is transmitted in intervals other than the data frame and has a length of integer times as much as that of a known bit string, comprising:

a clock oscillator configured to generate a reference clock signal;

a first phase-locked loop oscillator configured to generate an input clock signal synchronized with the input data signal;

a second phase-locked loop oscillator configured to generate an output clock signal synchronized with the reference clock signal, a frequency of said output clock signal being approximately equal to that of said input clock signal, and a phase of said output clock signal being different from that of said input clock signal;

a serial-parallel converter configured to convert the input data signal into a first parallel data signals of a predetermined number of parallel bits and a second parallel data signals of a predetermined number of idle pattern bits in synchronization with the input clock signal;

a detector configured to detect the data frame and its start and end positions from the second parallel data signals as a data detection signal and a first take-in signal;

a data extension circuit configured to time-axially extend the first parallel data signals by a predetermined clock length in synchronization with the input clock signal in accordance with the first take-in signal, thereby outputting extended data signals of said predetermined number of parallel bits;

a first signal generator configured to generate a second input take-in signal based on the data detection signal;

a second signal generator configured to generate a data interval signal by re-synchronizing the data detection signal with the output clock signal;

a third signal generator configured to generate a re-take-in signal of said predetermined number of parallel bits based on the second input take-in signal;

a data re-synchronizer configured to re-synchronize the extended data signals with the output clock signal to generate re-data signals of said predetermined number of parallel bits;

an idle pattern generator configured to self-generate an idle pattern as an idle signal, judge whether the input data signal is of the idle pattern or the data frame based on the data interval signal, output the self-generated idle signal if the input data signal is of the idle pattern, and output a delay signal and a selection signal if the input data signal is of the data frame;

a parallel-serial converter configured to convert the re-data signals into a serial signal in accordance with the re-take-in signal;

a data delay circuit configured to delay the serial signal in accordance with the delay signal; and a data selector configured to select the idle signal and the delayed signal as an output data signal in accordance with the selection signal.

2. The apparatus according to claim 1, wherein said predetermined number of parallel bits is determined by an absorption of phase difference between the input clock signal and the output clock signal, an avoidance of metastability, jitter, and skew, and an absorption of frequency deviation between the input clock signal and the output clock signal.

3. The apparatus according to claim 1, wherein said predetermined clock length is not less than said number of parallel bits.

4. The apparatus according to claim 1, wherein said frequency of said output clock signal is equal to that of said input clock signal.

5. The apparatus according to claim 1, wherein said frequency of said output clock signal is higher than that of said input clock signal.

6. An apparatus for re-synchronizing an input data signal to be transmitted as a serial signal having a data frame and idle pattern, comprising:

a clock oscillator configured to generate a reference clock signal;

a phase-locked loop oscillator configured to generate an input clock signal synchronized with the input data signal and an output clock signal synchronized with the reference clock signal, a frequency of said output clock signal being approximately equal to that of said input clock signal, and a phase of said output clock signal being different from that of said input clock signal;

a serial-parallel converter configured to convert the input data signal into a first parallel data signals of a predetermined number of parallel bits and a second parallel data signals of a predetermined number of idle pattern bits in synchronization with the input clock signal;

a detector configured to detect the data frame and its start and end positions from the second parallel data signals as a data detection signal;

a data extension circuit configured to time-axially extend the first parallel data signals by a predetermined clock length in synchronization with the input clock signal based on the data detection signal, thereby outputting extended data signals of said predetermined number of parallel bits;

a data re-synchronizer configured to re-synchronize the extended data signals with the output clock signal to generate re-data signals of said predetermined number of parallel bits;

an idle pattern generator configured to self-generate an idle pattern as an idle signal, judge whether the input data signal is of the idle pattern or the data frame based on the data detection signal, output the self-generated idle signal if the input data signal is of the idle pattern, and output a delay signal and a selection signal if the input data signal is of the data frame;

a parallel-serial converter configured to convert the re-data signals into a serial signal in accordance with the re-take-in signal;

a data delay circuit configured to delay the serial signal based on the delay signal; and a data selector configured to select the idle signal and the delayed signal as an output data signal based on the selection signal.

7. A method for re-synchronizing an input data signal to be transmitted as a serial signal having a data frame and idle pattern, in which the data frame has a certain length or less and has its start and end positions to be detected, and the idle pattern is transmitted in intervals other than the data frame and has a length of integral times as much as that of a known bit string, comprising the steps of:

generating a reference clock signal;

generating an input clock signal synchronized with the input data signal;

generating an output clock signal synchronized with the reference clock signal, a frequency of said output clock signal being about equal to that of said input clock signal, a phase of said output clock signal being different from that of said input clock signal;

converting the input data signal into a first parallel data signals of a predetermined number of parallel bits and a second parallel data signals of a predetermined number of idle pattern bits in synchronization with the input clock signal;

detecting the data frame and its start and end positions from the second parallel data signals as a data detection signal and a first take-in signal;

time-axially extending the first parallel data signals by a predetermined clock length in synchronization with the input clock signal in accordance with the first take-in signal, thereby outputting extended data signals of said predetermined number of parallel bits;

generating a second input take-in signal based on the data detection signal;

generating a data interval signal by re-synchronizing the data detection signal with the output clock signal;

generating configured to generate a re-take-in signal of said predetermined number of parallel bits based on the second input take-in signal;

re-synchronizing the extended data signals with the output clock signal to generate re-data signals of said predetermined number of parallel bits;

self-generating an idle pattern as an idle signal, judging whether the input data signal is of the idle pattern or the data frame based on the data interval signal, outputting the self-generated idle signal if the input data signal is of the idle pattern, and outputting a delay signal and a selection signal if the input data signal is of the data frame;

converting the re-data signals into a serial signal in accordance with the re-take-in signal;

delaying the serial signal in accordance with the delay signal; and selecting the idle signal and the delayed signal as an output data signal in accordance with the selection signal.

8. The method according to claim 7, wherein said predetermined number of parallel bits is determined by an absorption of phase difference between the input clock signal and the output clock signal, an avoidance of meta-stability, jitter, and skew, and an absorption of frequency deviation between the input clock signal and the output clock signal.

9. The method according to claim 7, wherein said predetermined clock length is not less than said number of parallel bits.

10. The method according to claim 7, wherein said frequency of said output clock signal is equal to that of said input clock signal.

11. The method according to claim 7, wherein said frequency of said output clock signal is higher than that of said input clock signal.

* * * * *